(12) United States Patent
Tsukada et al.

(10) Patent No.: US 8,710,823 B2
(45) Date of Patent: Apr. 29, 2014

(54) CONTACT SENSOR, DRIVER DEVICE, AND CARE BED

(75) Inventors: Shohei Tsukada, Osaka (JP); Yohei Kume, Osaka (JP); Hideo Kawakami, Osaka (JP); Tohru Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 221 days.

(21) Appl. No.: 13/275,391

(22) Filed: Oct. 18, 2011

(65) Prior Publication Data

US 2012/0091990 A1  Apr. 19, 2012

(30) Foreign Application Priority Data

Oct. 19, 2010 (JP) ................................. 2010-234325
Sep. 16, 2011 (JP) ................................. 2011-202898

(51) Int. Cl.
*G01R 19/00* (2006.01)
(52) U.S. Cl.
USPC .......................... 324/76.11; 297/118; 72/172
(58) Field of Classification Search
USPC .......................... 324/76.11; 297/118; 72/172
See application file for complete search history.

(56) References Cited

U.S. PATENT DOCUMENTS

| 5,878,620 | A * | 3/1999 | Gilbert et al. ................... 73/172 |
| 8,161,826 | B1 * | 4/2012 | Taylor ...................... 73/862.044 |
| 2006/0195020 | A1 * | 8/2006 | Martin et al. .................. 600/301 |
| 2011/0068935 | A1 * | 3/2011 | Riley et al. .................... 340/575 |
| 2012/0169093 | A1 * | 7/2012 | Kume et al. ................... 297/118 |

FOREIGN PATENT DOCUMENTS

| EP | 0 855 307 | | 7/1998 | |
| EP | 855307 A2 * | | 7/1998 | ............... B60N 2/00 |
| JP | 58-11832 | | 1/1983 | |
| JP | 60-39524 | | 3/1985 | |
| JP | 61-133519 | | 6/1986 | |
| JP | 5-101740 | | 4/1993 | |
| JP | 05101740 A * | | 4/1993 | ............... H01H 13/16 |
| JP | 2001-37821 | | 2/2001 | |
| JP | 2006-309959 | | 11/2006 | |
| JP | 2007-102719 | | 4/2007 | |
| WO | 99/60357 | | 11/1999 | |
| WO | WO 9960357 A1 * | | 11/1999 | ................ G01L 1/20 |

OTHER PUBLICATIONS

European Search Report, issued Feb. 10, 2012 in EP Application 11 18 5511.0-2214, which is a counterpart to the present application.

* cited by examiner

*Primary Examiner* — Patrick J Assouad
*Assistant Examiner* — Sean Curtis
(74) *Attorney, Agent, or Firm* — Wenderoth, Lind & Ponack, L.L.P.

(57) ABSTRACT

A contact sensor includes a conductive fabric, an insulative spacer having multiple openings, and a conductive sheet of a sheet-shaped conductor. The insulative spacer is interposed between the conductive fabric and the conductive sheet. Upon contact of a soft object such as a human body portion on the conductive fabric with force equal to or greater than a certain strength, the insulative spacer sinks in the soft object with the conductive fabric interposed therebetween. The conductive fabric is deformable in conformity with insulative pieces of the insulative spacer, such that touching of a portion of the conductive fabric on the conductive sheet provides detection of contact of the soft object.

17 Claims, 11 Drawing Sheets

CONTACT SENSOR, DRIVER DEVICE, AND CARE BED

RELATED ART

The present invention relates to contact sensors for contact detection, driver devices, and care beds.

In institutions such as hospitals and nursery facilities, care beds are widely used which are capable of having the backrest of the bed portion raised by an electric motor. In such a care bed, a portion of a human body or a foreign object may be nipped between the lower surface of the backrest and the bed frame in transition from the backrest raised position to the flat position. Countermeasures are now under consideration for detecting such nipping.

Such countermeasures include a method wherein a sheet-shaped contact sensor is applied entirely over the backface of the backrest to detect nipping of a portion of a human body or a foreign object by the contact sensor and the movement of the backrest is halted upon detection of the nipping.

Further, other countermeasures include a method wherein a panel-shaped contact sensor is attached to an outer peripheral side surface of an industrial robot, although not a care bed, to stop the operation of the industrial robot when something touches the contact sensor (for example, see JP-A-2007-102719).

Figure 13:
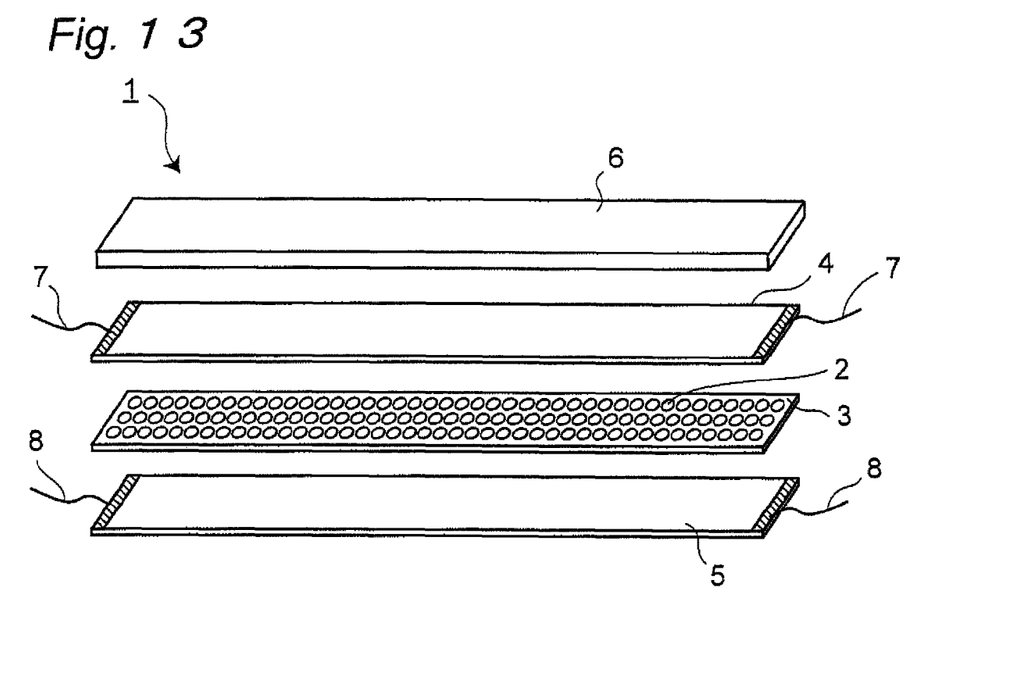
FIG. 13 is an exploded perspective view of a conventional contact sensor.

FIG. 13 is a perspective view of a conventional contact sensor 1. The conventional contact sensor 1 includes a rectangular sheet-shaped insulative spacer 3 having multiple bores 2, two rectangular sheet-shaped conductive sheets 4 and 5 that are disposed such that the respective conductive surfaces thereof face each other with the insulative spacer 3 interposed therebetween, and an insulative, rectangular sheet-shaped flexible sheet 6 covering the outer surface of the conductive sheet 4.

The conductive sheets 4 and 5 have their ends connected with conductive wires 7 and 8, respectively. The conductive wires 7 and 8 are coupled to a direct-current power source through a circuit for detecting, for example, current. The contact sensor 1 thus structured allows for detection of contact through change in, for example, current that occurs upon contact of something on the flexible sheet 6.

Figure 14:
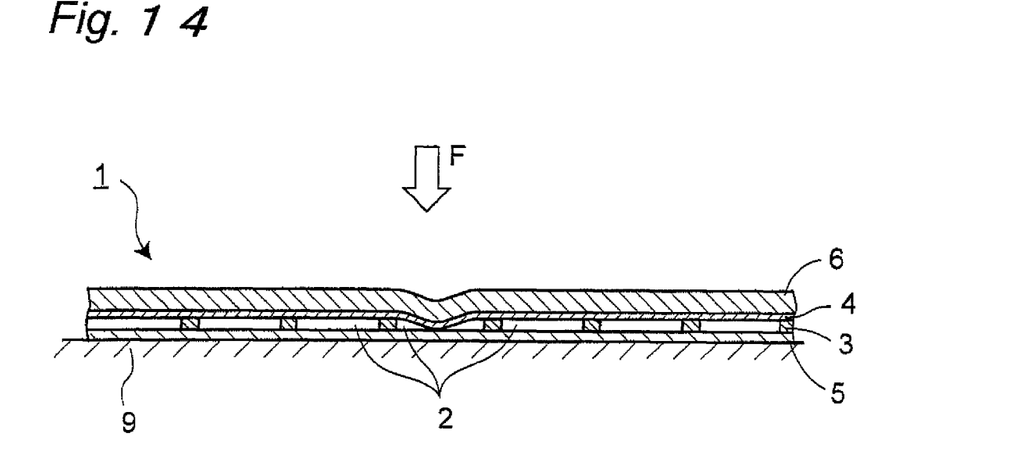
FIG. 14 is a cross-sectional view of the conventional contact sensor in a contact state.

FIG. 14 is a cross-sectional view of the conventional contact sensor 1 upon contact. Description is given of the operation of the contact sensor 1 for contact detection.

The contact sensor 1 is attached to, for example, a side surface 9 of an industrial robot. When pressing force F acts downward onto the flexible sheet 6, the flexible sheet 6 and the conductive sheet 4 deform with the pressing force F, causing a portion of the conductive sheet 4 to be pushed into a bore 2. The portion of the conductive sheet 4 pushed into the bore 2 tightly contacts the conductive sheet 5. As a result, change in, for example, current occurs upon establishment of electrical connection between the conductive wires 7 and 8, enabling the detection circuit to determine whether contact on the contact sensor 1 has occurred or not.

Use of such a contact sensor 1 allows for detection of contact from the outside over a wide range.

SUMMARY OF THE INVENTION

Accordingly, an object of the present invention is to provide a contact sensor, a driver device, and a care bed, for detecting contact of a soft object such as a human body at a high sensitivity.

In view of the above, the present invention discloses the following configurations.

According to a first aspect of the present invention, there is provided a contact sensor, comprising:
an insulative spacer having a plurality of openings;
a first conductive sheet touching a first surface of the insulative spacer and being deformable in such a manner as to get into any of the openings in the insulative spacer; and
a second conductive sheet touching a second surface of the insulative spacer and being deformable in such a manner as to get into any of the openings in the insulative spacer, wherein
electrical contact between the first conductive sheet and the second conductive sheet is to be established through the openings of the insulative spacer to provide contact detection.

According to an aspect of the present invention, there is provided a driver device, comprising;
the contact sensor of the above aspect; and
a casing having a surface mounted with the contact sensor,
the driver device being configured to be drive controlled based on contact detection by the contact sensor.

According to another aspect of the present invention, there is provided a care bed comprising the contact sensor of the above aspect.

The present invention provides contact sensors for detecting contact of a soft object at a high sensitivity, driver devices using the contact sensors, and care beds.

BRIEF DESCRIPTION OF THE DRAWINGS

These and other aspects and features of the present invention will become clear from the following description taken in conjunction with the embodiments thereof with reference to the accompanying drawings, in which.

DESCRIPTION OF THE EMBODIMENTS

Embodiments of the present invention are described below with reference to the drawings. In the description below, like components are given like reference numerals, and the redundant description thereof is not given in some cases. For easy understanding of the drawings, figures are schematically shown mainly focused on each component.

First Embodiment

Figure 1A:
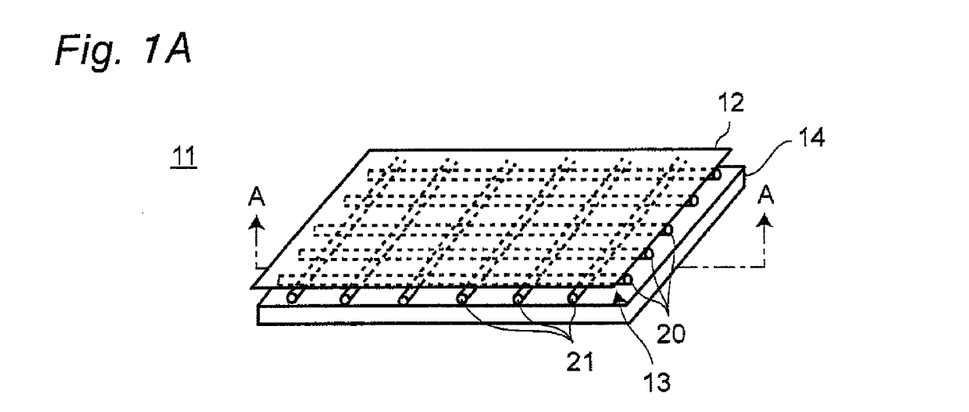
FIG. 1A is a perspective view of a contact sensor according to a first embodiment of the present invention.
Figure 1B:
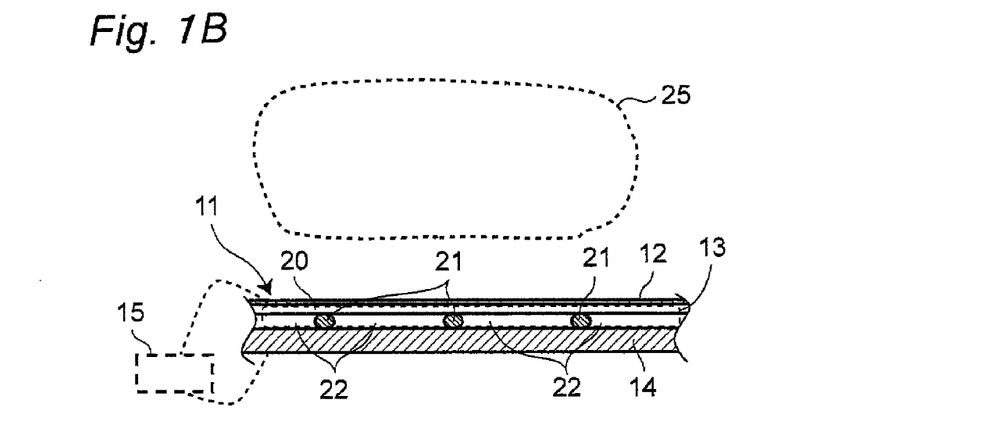
FIG. 1B is a partial cross-sectional view of the contact sensor of the first embodiment in a non-contact state, taken along line A-A in FIG. 1A.
Figure 1C:
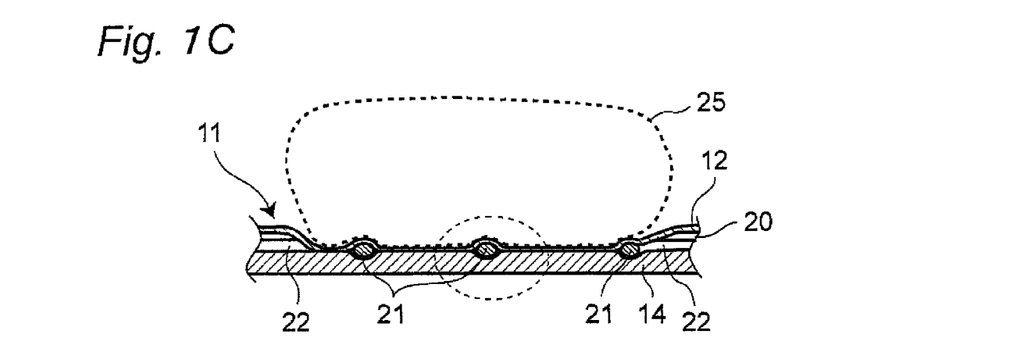
FIG. 1C is a partial cross-sectional view of the contact sensor of the first embodiment with a soft body contacting thereon, taken along line A-A in FIG. 1A.

FIGS. 1A to 1C are a perspective view and partial cross-sectional views of a contact sensor 11 according to a first embodiment of the present invention. FIG. 1A is a perspective view of the contact sensor 1, FIG. 1B is a partial cross-sectional view of the contact sensor 11 in a non-contact state, taken along line A-A of FIG. 1A, and FIG. 1C is a partial cross-sectional view of the contact sensor 11 in a state of being contacted by a soft object 25, taken along line A-A of FIG. 1A.

As shown in FIG. 1A, the contact sensor 11 of the first embodiment includes an insulative spacer 13 having multiple openings 22, and a conductive fabric 12 and a conductive sheet 14 that are arranged to interpose the insulative spacer 13. The conductive fabric 12 serving as an example of a first conductive sheet contacts a first surface of the insulative spacer 13, e.g., the upper surface in FIG. 1A. The conductive sheet 14 serving as an example of a second conductive sheet contacts a second surface of the insulative spacer 13, e.g., the lower surface in FIG. 1A. The conductive fabric 12 and the conductive sheet 14 are both conductive.

The conductive fabric 12 is a piece of woven fabric having surfaces of organic fiber very thinly covered with a metal. Although detailed description is given later, the conductive fabric 12 of the first embodiment needs to have deformability to agree with irregularities on the surface of the insulative spacer 13, and thus a thinnest possible fabric is desirably used. Specifically, the thickness is desirably 0.1 mm or less. The conductive fabric 12 of the first embodiment has a low resistance value so as to cause pronounced change in current or resistance upon contact of the conductive fabric 12 on the conductive sheet 14. In the first embodiment, the conductive fabric 12 is exemplarily PET woven fabric that is made of a material impregnated with copper and has a thickness on the order of 0.09 mm and a resistance on the order of 0.05 Ω/sq. The insulative spacer 13 is structured such that a plurality of insulative lines 20 and 21 are combined in a grid pattern. The components constituting the insulative spacer 13 (the insulative lines 20 and 21) are desirably of a material with higher rigidity than the conductive fabric 12 and the conductive sheet 14. The insulative lines 20 as well as the insulative lines 21 are, for example, arranged at equal intervals. As an example, in FIGS. 1A to 1C, the insulative spacer 13 is structured such that the insulative lines 21 and the insulative lines 20 are arranged orthogonal to one another. Specifically, the insulative spacer 13 is structured such that the insulative lines 20 that are arranged at equidistances and in parallel to one another are unfixedly placed over the insulative lines 21 that are arranged at equidistances and in parallel to one another. In the first embodiment, polyester of about 0.9 mm in diameter is used exemplarily for the insulative spacer 13.

Figure 3:
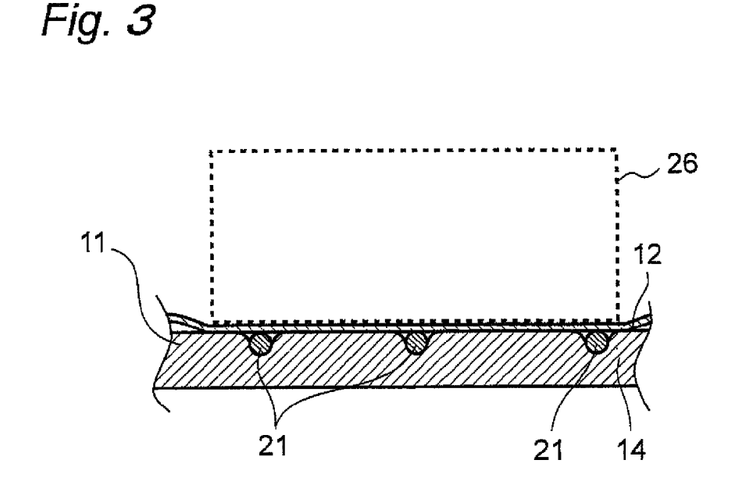
FIG. 3 is a partial cross-sectional view of the contact sensor of the first embodiment with a non-soft body contacting thereon.

The thickness of the conductive sheet 14 is dimensioned such that, upon application of external force onto a sheet surface, the conductive sheet 14 is freely deformable in the thickness direction (the vertical direction in FIGS. 1B and 1C). Although details are described later, in the first embodiment, at least some of the insulative lines 21 and 21 of the insulative spacer 13 shall sink in (dent in) the conductive sheet 14. For this reason, the conductive sheet 14 has to be made from a material that is easily deformable upon application of force on the conductive sheet 14. In the first embodiment, in order to detect contact of a non-soft object 26 as shown in FIG. 3, the conductive sheet 14 needs to have a thickness equal to or greater than that of the insulative spacer 13. For use as a material of the conductive sheet 14, a member having conductivity as well as flexibility in the thickness direction is desired. Specific materials of the conductive sheet 14 desirably include conductive sponge or conductive rubber. In the first embodiment, a conductive sponge with a thickness on the order of 3.4 mm and a resistance on the order of 0.05 Ω/sq is used as an exemplary conductive sheet 14.

As shown in FIG. 1B, in the contact sensor 11 of the first embodiment, in a state where nothing contacts the contact sensor 11, i.e., a soft object 25 does not contact the contact sensor 11, the conductive fabric 12 and the conductive sheet 14 do not contact each other at any portion over the entire region due to the presence of the insulative spacer 13.

Then, as shown in FIG. 1C, for example, a portion of a human body serving as an example of the soft object 25 contacts the contact sensor 11, and the conductive fabric 12 and the conductive sheet 14 partly contact each other. In the first embodiment, detection is made, by using a contact circuit 15, of change in current or resistance that occurs upon contact of the conductive fabric 12 on the conductive sheet 14 of the contact sensor 11, hence detection of contact of a soft object 25 on the contact sensor 11.

Figure 2:
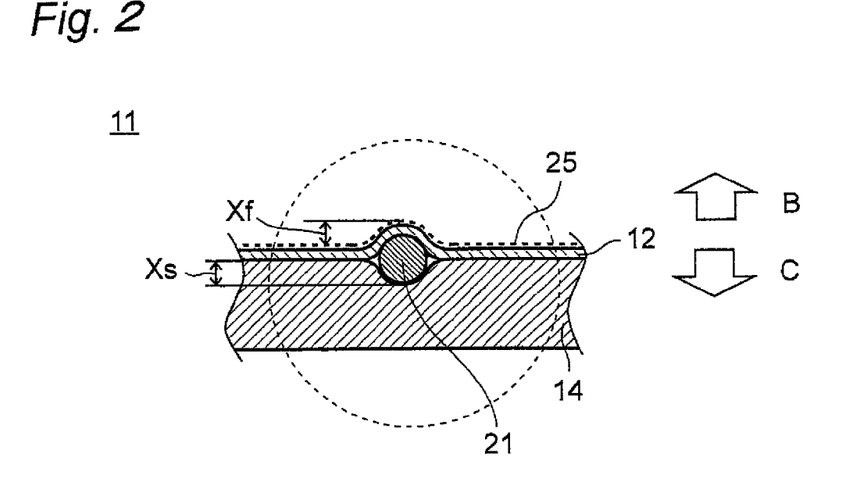
FIG. 2 is a partially enlarged cross-sectional view of the contact sensor of the first embodiment with the soft body contacting thereon.

FIG. 2 is a partially enlarged cross-sectional view of the contact sensor 11 in the state where a soft object 25 contacts the contact sensor 11 according to the first embodiment.

Upon contact of the soft object 25 on the contact sensor 11 with a force equal to or greater than a certain strength, the insulative lines 20 and 21 sink both into the soft object 25 and the conductive sheet 14 (for simplification, FIG. 2 shows a state in which the insulative lines 21 alone sink in the soft object 25 and the conductive sheet 14). At this time, the conductive fabric 12 deforms in conformity to the contours of the insulative lines 20 and 21, such that the conductive fabric 12 and the conductive sheet 14 come into contact. It is to be noted that the conductive fabric 12 needs to have flexibility to such a degree as to agree with the insulative lines 20 and 21. The insulative lines 20 and 21 have to be of a material with greater rigidity than the soft object 25 and the conductive sheet 14. In the first embodiment, since polyester is used for the insulative lines 20 and 21, the insulative lines 20 and 21 are sufficiently greater in rigidity than the conductive sponge serving as the conductive sheet 14.

The insulative lines 20 and 21 desirably have a circular cross section. Description is given of reasons why a circular cross section is desired of the insulative lines 20 and 21. In case of a shape that becomes thinner in the direction of the arrow B or C in FIG. 2 as from the center of the cross section of either insulative line 20 or 21, the insulative lines 20 and 21 are easily sinkable into the soft object 25 or the conductive sheet 14, providing the function sought by the present invention. In case of, for example, a shape that is pointed in the direction of the arrow B and the soft object 25 being a portion of a human body, pain may be given to that person. To avoid such a situation, an optimal cross sectional shape of the insulative lines 20 and 21 is thus circular in the first embodiment.

FIG. 3 is a cross-sectional view of the contact sensor 11 in a state where a non-soft object 26 contacts the contact sensor 11 of the first embodiment. The non-soft object 26 is harder than the soft object 25 and is harder than the insulative lines 20 and 21. In other words, the non-soft object 26 is an object that does not accept sinking of the insulative lines 20 and 21. For example, exemplary non-soft objects 26 may be made of metal materials or resinous materials.

In the first embodiment, as described above, the conductive sheet 14 has a thickness equal to or greater than the thickness of the insulative spacer 13. With this configuration, when the non-soft object 26 contacts the insulative lines 20 and 21 with a force equal to or greater than a certain strength with the conductive fabric 12 interposed therebetween, the insulative lines 20 and 21 completely sink into the conductive sheet 14 (for simplification, FIG. 3 shows a state in which the insulative lines 21 alone sink into the conductive sheet 14). Sinking of these insulative lines 20 and 21 causes the conductive fabric 12 and the conductive sheet 14 to contact each other, enabling detection of contact of the non-soft object 26.

As shown in FIG. 3, in case of the non-soft object 26 contacting the contact sensor 11, detection of contact with the contact sensor 11 involves sinking of the insulative lines 20 and 21 completely into the conductive sheet 14 so as for the conductive fabric 12 and the conductive sheet 14 to contact each other. Thus, as compared with the soft object 25 shown in FIG. 2, the non-soft object 26 shown in FIG. 3 takes greater force for contact detection. In other words, the contact sensor 11 of the first embodiment uses the property of the soft object 25 to deform in conformity to the insulative lines 20 and 21, hence enabling detection of the soft objects 25 at a higher sensitivity in comparison with detection of the non-soft objects 26. Thus, use of the contact sensor 11 of the first embodiment allows for detection of contact of a portion of a human body, which is an example of the soft object 25, at a higher sensitivity as compared with the non-soft object 26 while achieving a contact sensor with less erroneous detections.

Herein, the specific contents of the above-described detection of soft objects 25 at a higher sensitivity as compared with detection of non-soft objects 26 are clarified using equations. In the description below, only the insulative lines 21 are considered as insulative lines and the insulative lines 20 are not described, for the illustrative purpose only to facilitate understanding.

As shown in FIG. 2, assume that $x_f$ is the amount of deformation of the insulative lines 21 sinking into the soft object 25, and that $x_s$ is the amount of deformation of the insulative lines 21 sinking into the conductive sheet 14. Further, assume that $k_f$ is the modulus of elasticity of the soft object 25, that $k_s$ is the modulus of elasticity of the conductive sheet 14, and that $F_{(xf+xs)}$ is the force that occurs between the contact sensor 11 and the soft object 25. In this case, the following Equation 1 is established.

[Formula 1]

$$F_{(x_f+x_s)} = \frac{1}{1/k_f + 1/k_s} \cdot (x_f + x_s) \quad \text{(Equation 1)}$$

As shown in FIG. 3, when the contacting object is the non-soft object 26 and not the soft object 25, $x_f$ is 0 and $k_f$ is infinite, and Equation 1 becomes the following Equation 2. $F_{(xs)}$ is the force that occurs between the contact sensor 11 and the non-soft object 26.

[Formula 2]

$$F_{(x_s)} k_s x_s \quad \text{(Equation 2)}$$

For the conductive fabric 12 and the conductive sheet 14 to contact each other, the total amount of deformation has only to be equal to the thickness d of the insulative lines 21 at the lower side, i.e., at the side of the conductive sheet. Thus, the force $F_{(d)}$ that occurs at the contact of the conductive fabric 12 and the conductive sheet 14 is expressed as the following Equation 3 in case of the soft object 25 and as the following Equation 4 in case of the non-soft object 26.

[Formula 3]

$$F_{(d)} = \frac{1}{1/k_f + 1/k_s} \cdot d \quad \text{(Equation 3)}$$

[Formula 4]

$$F_{(d)} k_s \cdot d \quad \text{(Equation 4)}$$

The modulus of elasticity of Equation 4 is the modulus of elasticity $k_s$ of the conductive sheet 14. On the other hand, the modulus of elasticity of Equation 3 is the composite modulus of elasticity $(1/\{1/(k_f)+1/(k_s)\})$ obtained when the conductive sheet 14 is connected in series with the soft object 25. In other words, it is understood from these equations that the modulus of elasticity of Equation 3 of the soft object 25 is lower than the modulus of elasticity of Equation 4 of the non-soft object 26. Hence, for the deformation of the same amount, contact of the soft object 25 involves weaker force to cause deformation than in contact of the non-soft object 26. For this reason, the contact sensor 11 of the first embodiment is reactive to the soft object 25 at a higher sensitivity in comparison to the non-soft object 26. Accordingly, the single contact sensor 11 of the first embodiment is capable of detecting contact of a human body (the soft object 25) and contact of a harder foreign object (the non-soft object 26) at different sensitivities without providing any additional contact sensor.

Figure 4:
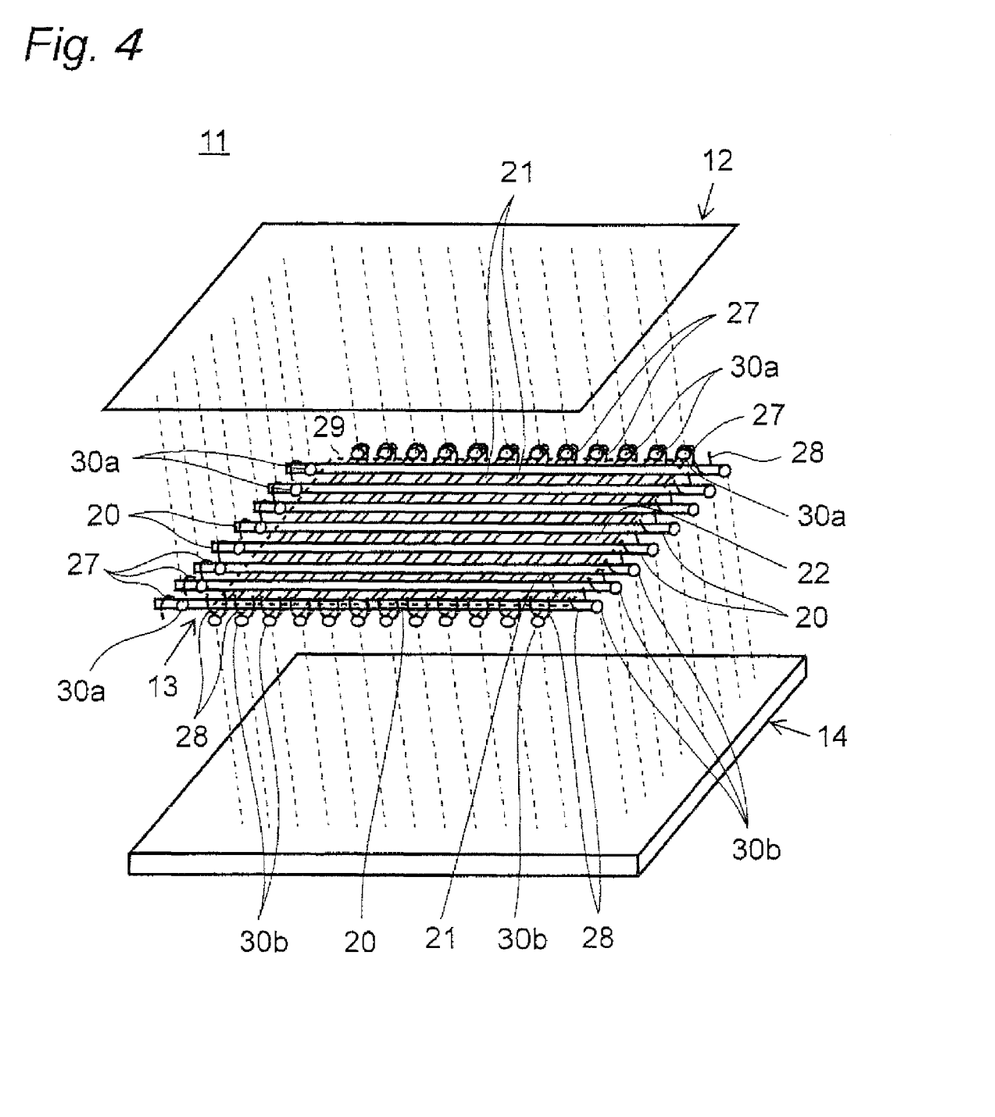
FIG. 4 is an exploded perspective view of the contact sensor of the first embodiment.

FIG. 4 is an exploded perspective view of the contact sensor 11 of the first embodiment.

As shown in FIG. 4, the insulative spacer 13 is structured such that the insulative lines 20 lined at equidistances in parallel are placed over the insulative lines 21 lined at equidistances in parallel in a grid pattern. With such a structure, the insulative spacer 13 is minimized in area, which means the sensor is reduced minimally in insensitive region. Further, because the insulative lines 20 and 21 of the insulative spacer 13 serving as the insensitive region has constant widths, the insulative lines 20 and 21 sink into the soft object 25 and the conductive sheet 14 evenly. The contact sensor 11 of the first embodiment therefore allows for approximately uniform contact detection sensitivity in the insensitive region.

The sensitivity of the contact sensor 11 varies depending on the line diameter or material or arrangement intervals of the insulative lines 20 and 21. The contact sensor 11 needs to provide detection at such a sensitivity that injury is obviated at the time of nipping of a portion of a human body. For this reason, in the first embodiment, an insulative spacer 13 is exemplarily used in which insulative lines 20 and 21 made of polyester fiber on the order of 0.9 mm in line diameter are arranged at a pitch on the order of 5 mm.

Regarding this aspect, the inventors conducted experiments on various conditions so as to enhance the sensitivity to soft objects in comparison with the sensitivity to non-soft objects and found out that the relationship between the area of the sensitive region (the openings among the insulative lines 20 and 21) and the area of the insensitive region is preferably 0.95≥the area of the sensitive region/(the area of the sensitive region+the area of the insensitive region)≥0.6. For example, the above condition, i.e., the line diameter of the insulative lines 20 and 21 is 0.9 mm in diameter and the pitch is 5 mm, makes $5^2/(0.45+5+0.45)^2=0.72$, which satisfies the relationship. It is considered that satisfying this relationship allows for enhancement of the sensitivity to the soft object in comparison with the sensitivity to the non-soft object.

The insulative lines 20 are held by second holding portions 28 and securing portions 30a. Specifically, the second holding portions 28 hold to the conductive fabric 12 first end portions at one end side, e.g., the right end portions in FIG. 4, of the insulative lines 20 while permitting sliding of the first end portions relative to the conductive fabric 12. The securing portions 30a fix to the conductive fabric 12 second end portions at the other end side, e.g., the left end portions in FIG. 4, of the insulative lines 20. The insulative lines 21 are held by the second holding portions 28 and the securing portions 30a. Specifically, the second holding portions 28 hold to the conductive fabric 12 first end portions at one end side, e.g., the lower end portions in FIG. 4, of the insulative lines 21 while permitting sliding of the first end portions relative to the conductive fabric 12. The securing portions 30a fix to the conductive fabric 12 second end portions at the other end side, e.g., the upper end portions in FIG. 4, of the insulative lines 21.

Likewise, the insulative lines 20 are held by first holding portions 27 and securing portions 30b. Specifically, the first holding portions 27 hold to the conductive sheet 14 second end portions at one end side, e.g., the left end portions in FIG. 4, of the insulative lines 20 while permitting sliding of the second end portions relative to the conductive sheet 14. The securing portions 30b fix to the conductive sheet 14 first end portions at the other end side, e.g., the right end portions in FIG. 4, of the insulative lines 20. The insulative lines 21 are held by the first holding portions 27 and the securing portions 30b. Specifically, the first holding portions 27 hold to the conductive sheet 14 second end portions at one end side, e.g., the backward end portions in FIG. 4, of the insulative lines 21 while permitting sliding of the second end portions relative to the conductive sheet 14. The securing portions 30b fix to the conductive sheet 14 first end portions at the other end side, e.g., the frontward end portions in FIG. 4, of the insulative lines 21.

Specifically, the second holding portions 28 are provided to the conductive fabric 12, and the first holding portions 27 are provided to the conductive sheet 14.

The conductive fabric 12 and the first end portions of the insulative lines 20 and 21 are adhesively fixed to one another with an adhesive. The securing portions 30a are solidified portions of the adhesive. Likewise, the conductive sheet 14 and the second end portions of the insulative lines 20 and 21 are adhesively fixed to one another with an adhesive. The securing portions 30b are solidified portions of the adhesive.

As exemplary first holding portions 27 of the first embodiment, threads of a fiber formed into a U shape are sewn to the conductive sheet 14 with the insulative lines 20 and 21 passed through the respective U-shaped portions. Likewise, as exemplary second holding portions 28 of the first embodiment, threads of a fiber formed into a U shape are sewn to the conductive fabric 12 with the insulative lines 20 and 21 passed through the respective U-shaped portions.

Figure 5A:
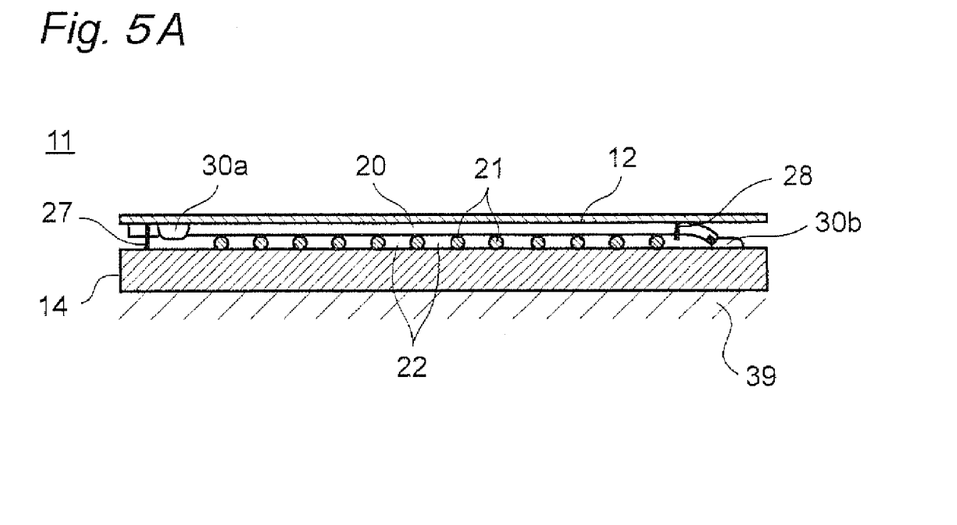
FIG. 5A is a cross-sectional view of the contact sensor of the first embodiment being mounted on a flat surface of a casing.
Figure 5B:
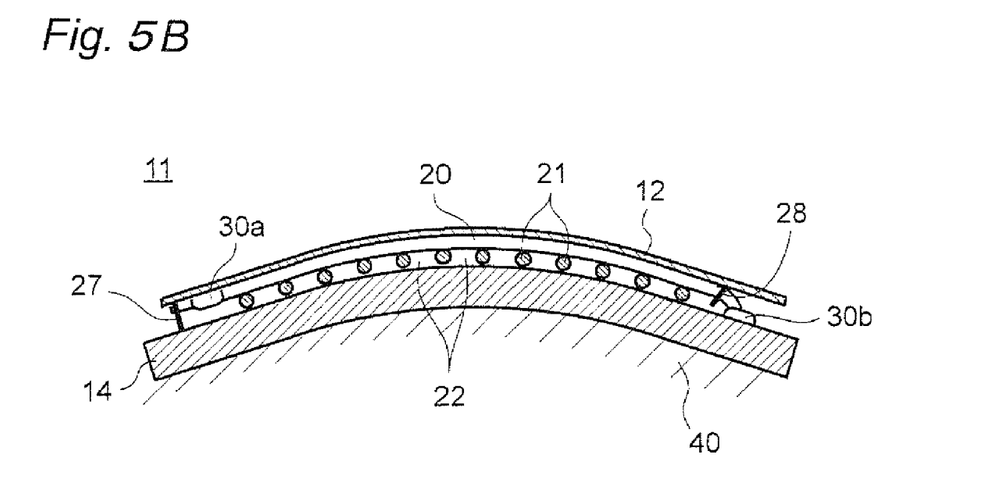
FIG. 5B is a cross-sectional view of the contact sensor of the first embodiment being mounted on a curved surface of a casing.

FIGS. 5A and 5B are cross-sectional views of the contact sensor 11 of the first embodiment. FIG. 5A is a cross-sectional view of the contact sensor 11 mounted on a flat surface of a casing 39, and FIG. 5B is a cross-sectional view of the contact sensor 11 mounted on a curved surface of a casing 40.

Referring to FIGS. 5A and 5B, description is given of reasons why the contact sensor 11 is mountable to a curved surface of the casing 40.

The insulative lines 20 and 21 of the contact sensor 11 are each fixed at their second end portions to the conductive fabric 12 by means of the securing portions 30a. The insulative lines 20 and 21 of the contact sensor 11 are each fixed at their first end portions to the conductive sheet 14 by means of the securing portions 30b.

As shown in FIG. 5B, when the conductive sheet 14 is bent in a raised shape (the upwardly raised shape in FIG. 5B), the insulative lines 20 and 21 have their ends fixed to the conductive sheet 14 at one side, i.e., at the side of the securing portions, while having their ends open to the conductive sheet 14 at the other side, i.e., at the side of the holding portions. Thus, the insulative lines 20 and 21 slide over the conductive sheet 14 to be bent along the conductive sheet 14. Likewise, the insulative lines 20 and 21 have their ends fixed to the conductive fabric 12 at one side, i.e., at the side of the securing portions, while having their ends open to the conductive fabric 12 at the other side, i.e., at the side of the holding portions. Hence, the conductive fabric 12 slides over the insulative lines 20 and 21 to be bent along the insulative lines 20 and 21. Further, the insulative spacer 13 is configured such that the insulative lines 20 are merely placed over the insulative lines 21, and that the portions where the insulative lines 20 and 21 cross one another are not fixed (adhesively). Thus, the insulative lines 20 are capable of sliding over the insulative lines 21. Bend of the insulative spacer 13 thus structured does not produce force in the laminating direction, and the conductive fabric 12 maintains a constant distance from the conductive sheet 14 such that contact therebetween does not occur. That is, merely bending such an insulative spacer 13 does not cause contact between the conductive fabric 12 and the conductive sheet 14, which enables the contact sensor 11 of the first embodiment to effect contact detection. Accordingly, the contact sensor 11 of the first embodiment is mountable to the curved surface of the casing 40.

Figure 6:
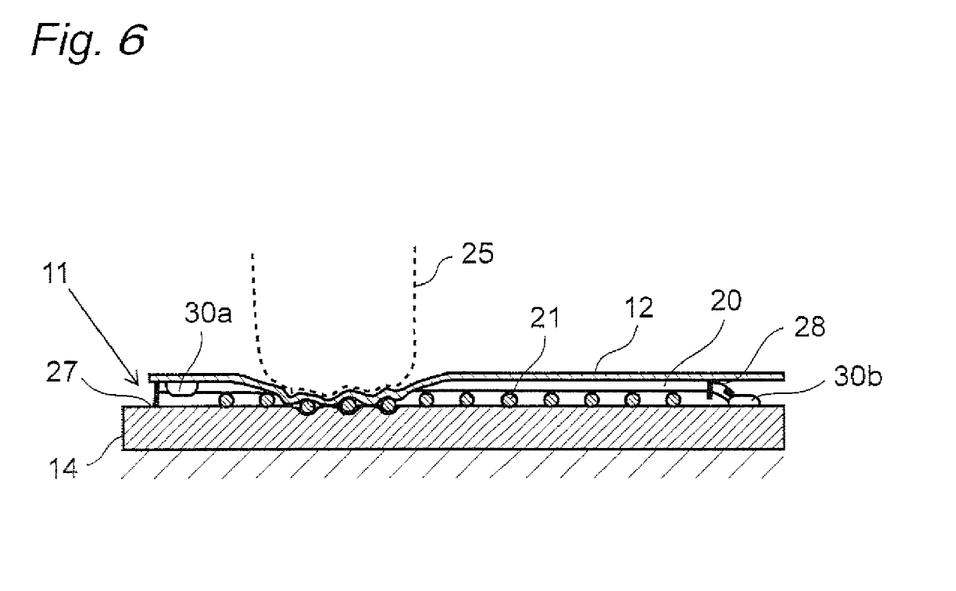
FIG. 6 is a cross-sectional view of the contact sensor of the first embodiment with a soft object contacting thereon.

FIG. 6 is a cross-sectional view of the contact sensor 11 in contact with a soft object 25 according to the first embodiment.

As described above, in the contact sensor 11 of the first embodiment, the second end portions at one side of the insulative lines 21 are fixed to the conductive fabric 12 by means of the securing portion 30a, and the first end portions are held slidingly by means of the second holding portions 28. Thus, in the contact sensor 11 of the first embodiment, the conductive fabric 12 is slidable over the insulative spacer 13.

As shown in FIG. 6, when a soft object 25 contacts the contact sensor 11, the contact sensor 11 acts such that the soft object 25 sinks in the insulative lines 21 with the conductive fabric 12 interposed therebetween. At this time, since the conductive fabric 12 holds the first end portions of the insulative lines 21 slidably by means of the second holding portions 28, the first end portions constitute open ends, such that the conductive fabric 12 is movable relative to the insulative lines 21. Hence, even when any object contacts the contact sensor 11, the tensile force of the conductive fabric 12 does not become higher, and the insulative lines 20 and 21 are easily agreed to the conductive fabric 12. For this reason, the contact sensor 11 of the first embodiment can detect soft objects 25 at a high sensitivity.

Consideration is given of a case in which the conductive fabric 12 is fixed to the insulative lines 20 and 21 at their both ends, unlike the first embodiment. In a case where the contact sensor 11 is bent with the conductive fabric 12 fixed to both ends of the insulative lines 20 and 21, the conductive sheet 14 is pressed toward the insulative lines 20 and 21 to come into contact with the conductive fabric 12, which may cause undesired contact detection. Specifically, when the contact sensor 11 is bent with the conductive fabric 12 fixed to the insulative lines 20 and 21 at their both ends, contact may be detected despite the absence of contact of a soft object 25 or non-soft object 26. Thus, the conductive fabric 12 being fixed at the both ends of the insulative lines 20 and 21 is not suitable for contact detection in case of conducting detection by the contact sensor applied to an object having a curved portion.

According to the first embodiment, upon contact of a soft object 25 on the contact sensor 11, contact detection is effected in such a manner that, by making use of the property of the soft object 25 to deform in conformity with the insulative spacer 13 (the insulative lines 20 and 21), the conductive fabric 12 together with the soft object 25 are caused to enter the openings 22 in the insulative spacer 13, such that the conductive fabric 12 contacts the conductive sheet 14. Meanwhile, upon contact of a non-soft object 26 on the contact sensor 11, contact detection is effected in such a manner that, by making use of the property of the non-soft object 26 not to deform in conformity with the insulative spacer 13 (the insulative lines 20 and 21), the insulative lines 20 and 21 alone are caused to sink in the conductive sheet 14, such that the conductive fabric 12 contacts the conductive sheet 14. Accordingly, the first embodiment provides for detection of soft objects 25 with smaller force in comparison with detection of non-soft objects 26, enabling detection of soft objects 25 at a higher sensitivity in comparison with non-soft objects 26.

Second Embodiment

Figure 7:
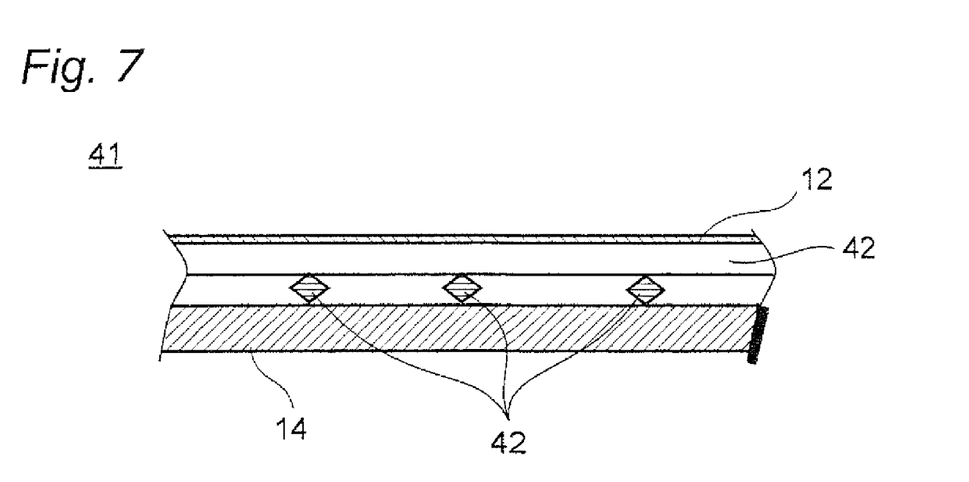
FIG. 7 is a cross-sectional view of a contact sensor including insulative lines with a rhombic cross section according to a second embodiment of the present invention.

FIG. 7 is a cross-sectional view of a contact sensor 41 having insulative lines 42 with a rhombic cross section according to a second embodiment of the present invention. The insulative lines 42 replace the insulative lines 20 and 21 of the first embodiment. The second embodiment is the same as the first embodiment in the configuration other than the insulative lines 42. As shown in FIG. 7, the insulative lines 42 of the second embodiment are structured to have a cross sectional shape with the tips (the tips on the side of the conductive fabric 12) tapered toward the conductive fabric 12.

The insulative lines 42 are easily sinkable into a soft object 25 with the conductive fabric 12 interposed therebetween because of their rhombic cross section, thus achieving enhancement in sensitivity of the contact sensor 41. Cross sectional shapes with tapered tips include a circular arcuate shape and a triangular shape in addition to rhombic insulative lines 42. In case of a rhombic cross section, assuming that the soft object 25 is a portion of a human body, appropriate selection of material or thickness of the conductive fabric 12 is needed to avoid injury to the human body.

Figure 8:
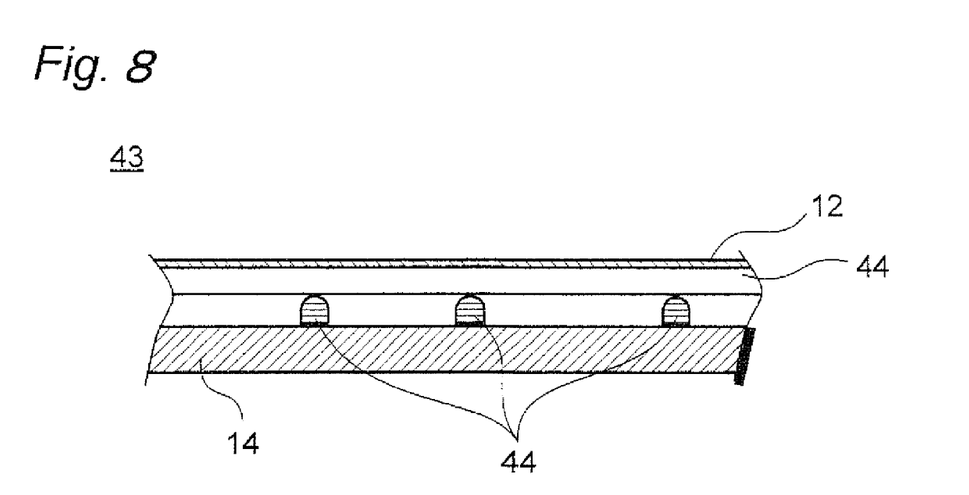
FIG. 8 is a cross-sectional view of a contact sensor including insulative lines with a D-shaped cross section according to the second embodiment.

FIG. 8 is a cross-sectional view of a contact sensor 43 having insulative lines 44 with a D-shaped cross section according to a variation of the second embodiment. The insulative lines 44 replace the insulative lines 20 and 21 of the first embodiment. The variation of the second embodiment of FIG. 8 is the same as the first embodiment in the configuration other than the insulative lines 44. As shown in FIG. 8, the insulative lines 44 may be structured to have a D-shaped cross section with the tips facing the conductive fabric 12 formed circular arcuate and the tips facing the conductive sheet 14 formed flat.

The insulative lines 44 are easily sinkable in the soft object 25 with the conductive fabric 12 interposed therebetween by having the tips on the side of the conductive fabric 12 formed circular arcuate and are hardly sinkable in the conductive sheet 14 by having the tips on the side of the conductive sheet 14 formed flat. Thus, the contact detection sensitivity to non-soft objects 26 is lowered, and the contact detection sensitivity to soft objects 25 is relatively enhanced. Further, since the tips on the side of the conductive fabric 12 are circular arcuate, inflicting injury on human body is avoided even in case of the soft object 25 being a portion of a human body as in the first embodiment.

Third Embodiment

Figure 9:
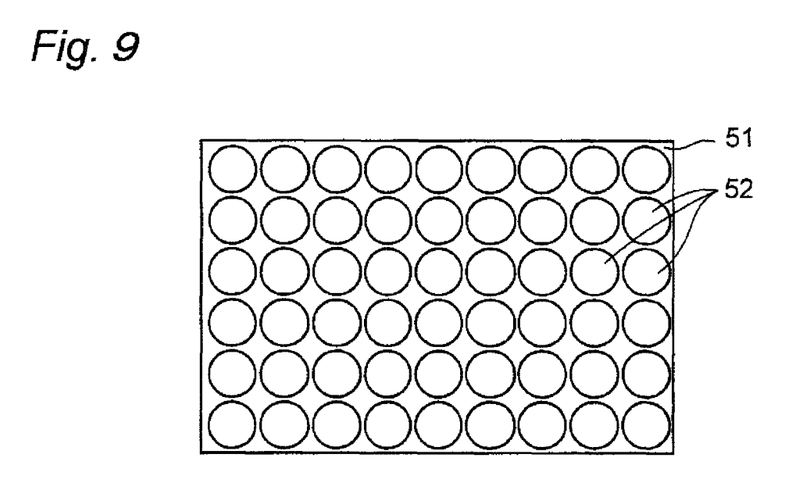
FIG. 9 is a top view of a perforated insulative spacer of a contact sensor according to a third embodiment of the present invention.

FIG. 9 is a top view of an insulative spacer 51 constituted by a perforated, quadrilateral thin insulative sheet of a contact sensor according to a third embodiment of the present invention. The insulative spacer 51 of the third embodiment replaces the insulative spacer 13 of the first embodiment. The third embodiment is the same as the first embodiment in the configuration other than the insulative spacer 51. As shown in FIG. 9, the insulative spacer 51 is structured such that circular openings 52 of the same inner diameter are laterally and longitudinally aligned to form rows at equidistances. The contact sensor is capable of detecting contact of a soft object 25 at a high sensitivity also with the use of the insulative spacer 51. It is to be noted however that, in order to establish the earlier-mentioned relationship of 0.95≥the area of the sensitive region/(the area of the sensitive region+the area of the insensitive region)≥0.6, the openings 52 have to be provided at short distances, and careful selection is needed with respect to the material of the insulative spacer 51 so as to maintain strength to withstand breakage.

Fourth Embodiment

Figure 10A:
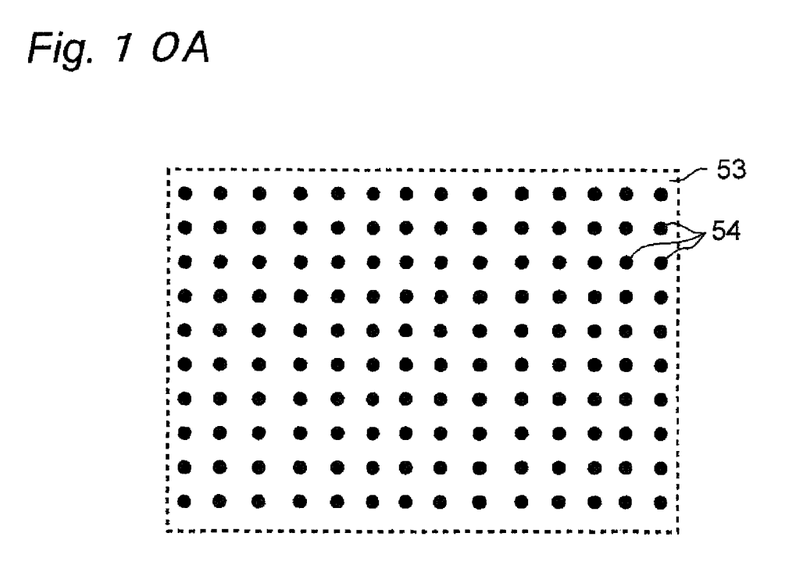
FIG. 10A is a top view of a dotted insulative spacer according to a fourth embodiment.
Figure 10B:
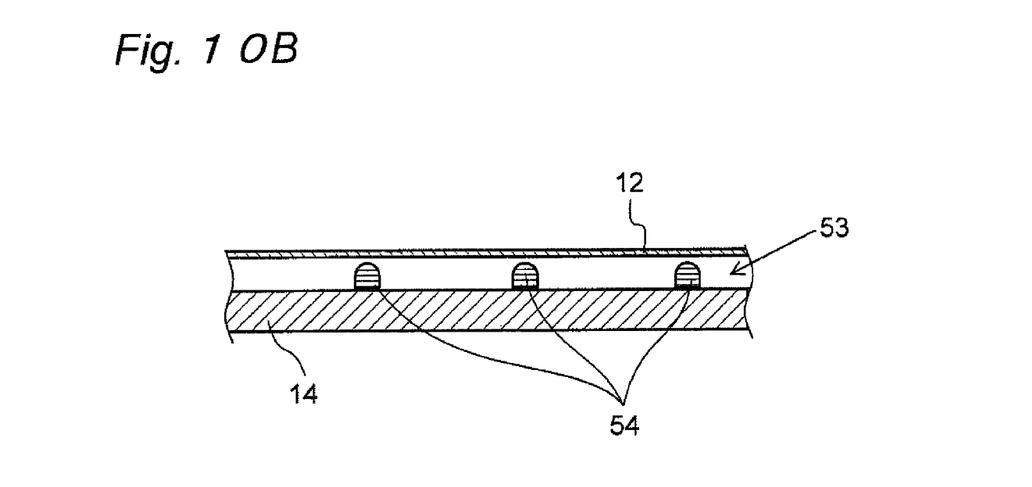
FIG. 10B is a partial cross-sectional view of the dotted insulative spacer of the fourth embodiment.

FIG. 10A is a top view of a dotted insulative spacer 53 of a contact sensor according to a fourth embodiment. FIG. 10B is a partial cross-sectional view of the dotted insulative spacer 53 of the contact sensor of the fourth embodiment.

The insulative spacer 53 of a variation of the fourth embodiment replaces the insulative spacer 13 of the first embodiment. The variation of the fourth embodiment is the same as the first embodiment in the configuration other than the insulative spacer 53. As shown in FIGS. 10A and 10B, the insulative spacer 53 is constituted by a plurality of semi-spherical insulative pieces 54 of generally the same outer diameter. The insulative pieces 54 have a thickness (the vertical length on the paper) on the order of 1 mm. Specifically, the insulative spacer 53 is structured such that the semi-spherical insulative pieces 54 are applied onto the conductive sheet 14 in a grid pattern at equidistances with the flat surfaces of the insulative pieces 54 placed on the side of the conductive sheet 14. In this case, the sensitive region (the openings) is a region defined by the space among the insulative pieces 54, and the insensitive region is defined by the insulative pieces 54. Thus, the conductive fabric 12 gets into gaps between the insulative pieces 54 and the insulative pieces 54 sink into the conductive sheet 14, such that contact is detected. The contact sensor is capable of detecting contact of a soft object 25 at a high sensitivity also by the use of the insulative spacer 53. Unlike the first to third embodiment, a separate sheet is not used for the insulative spacer and the insulative pieces 54 have only to be applied on the conductive sheet 14, and thus the contact sensor of the fourth embodiment can be manufactured easily at low cost. It should be noted that, in the first through third embodiments, the conductive fabric 12 and the conductive sheet 14 are fixed with the insulative spacer interposed therebetween, whereas in the fourth embodiment, the conductive fabric 12 and the conductive sheet 14 are directly fixed to each other.

Figure 10C:
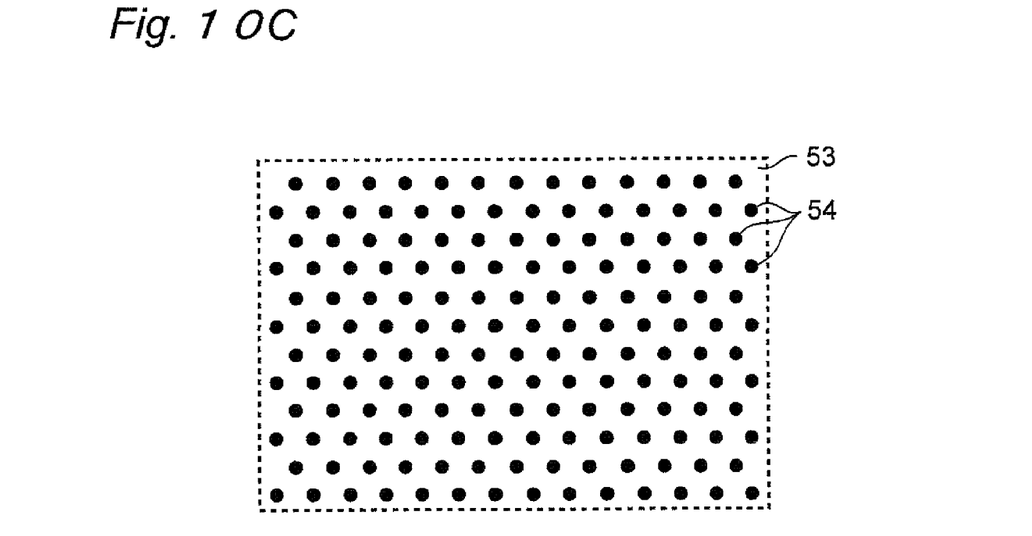
FIG. 10C is a top view of a dotted insulative spacer according to a first variation of the fourth embodiment.

Further, alteration of the pitch of the insulative pieces 54 allows for higher bendability of the conductive sheet 14 or change in detection sensitivity. FIG. 10C illustrates a first variation of the fourth embodiment in which the pitch of the insulative pieces 54 is altered. As shown in FIG. 10C, if the sensitivity is too high with the arrangement in a grid pattern as shown in FIG. 10A, arranging the insulative pieces 54 in a staggered manner allows for lowered sensitivity as compared with the arrangement of FIG. 10A, thus enabling contact detection at an appropriate sensitivity.

Further, a contact sensor with sensitivities varied by portions can be manufactured by appropriately changing the arrangement of the insulative pieces 54 portion by portion. Specifically, for example, the pitch of the insulative pieces 54 may be shortened at a portion of the contact sensor to lower the sensitivity thereat, and the pitch of the insulative pieces 54 may be extended at the other portions to enhance the sensitivity, thereby achieving a contact sensor with a partly lowered sensitivity.

Figure 10D:
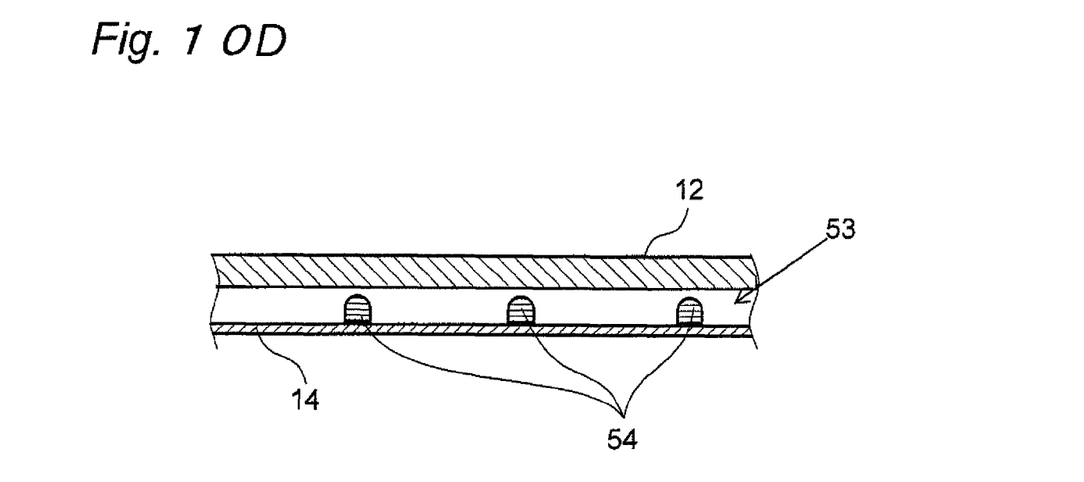
FIG. 10D is a partial cross-sectional view of a dotted insulative spacer according to a second variation of the fourth embodiment.

Also, as illustrated in a second variation of FIG. 10D, the thickness of the conductive sheet 14 may be reduced as compared with the thickness of the conductive fabric 12, thus reducing the sensitivity to soft objects 25. In other words, in comparison with the case illustrated in FIG. 10B, sensitivity can be set to a substantially equal level toward soft objects 25 and toward non-soft objects 26. As shown in FIG. 10B, if the conductive sheet 14 is greater in thickness than the conductive fabric 12, the sensitivity to soft objects 25 is much higher than that to non-soft objects 26. However, as shown in FIG. 10D, the sensitivity to soft objects 25 may be set to a level slightly higher than that to non-soft objects 26 when the thickness of the conductive sheet 14 is smaller than the thickness of the conductive fabric 12.

Figure 10E:
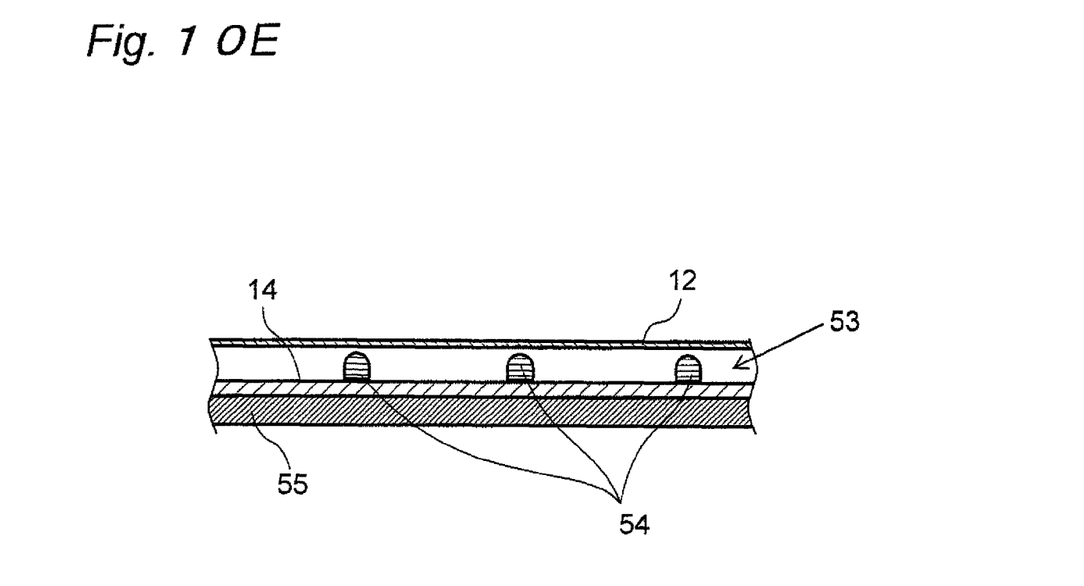
FIG. 10E is a partial cross-sectional view of a dotted insulative spacer according to a third variation of the fourth embodiment.

As illustrated in a third variation of FIG. 10E, the conductive sheet 14 of FIG. 10B may be provided in the form of a thin conductive sheet 14 and a sponge 55. As the conductive sheet 14 is expensive, combined use of the thin conductive sheet 14 and the sponge 55 as shown achieves reduction in price of the contact sensor. In the second variation of FIG. 10D, the conductive fabric 12 of FIG. 10B may be constituted by a thin conductive fabric 12 and the sponge 55.

Functions desired for the contact sensor vary depending on the arrangement of the contact sensor or the intended use thereof. Thus, the variations shown in FIGS. 10B through 10E are preferably combined appropriately to achieve desired performance.

Since establishment of the earlier-mentioned relationship of 0.95≥the area of the sensitive region/(the area of the sensitive region+the area of the insensitive region)≥0.6 highly depends on the arrangement of the insulative pieces 54, application of the insulative pieces 54 is preferably performed precisely.

Fifth Embodiment

Figure 11:
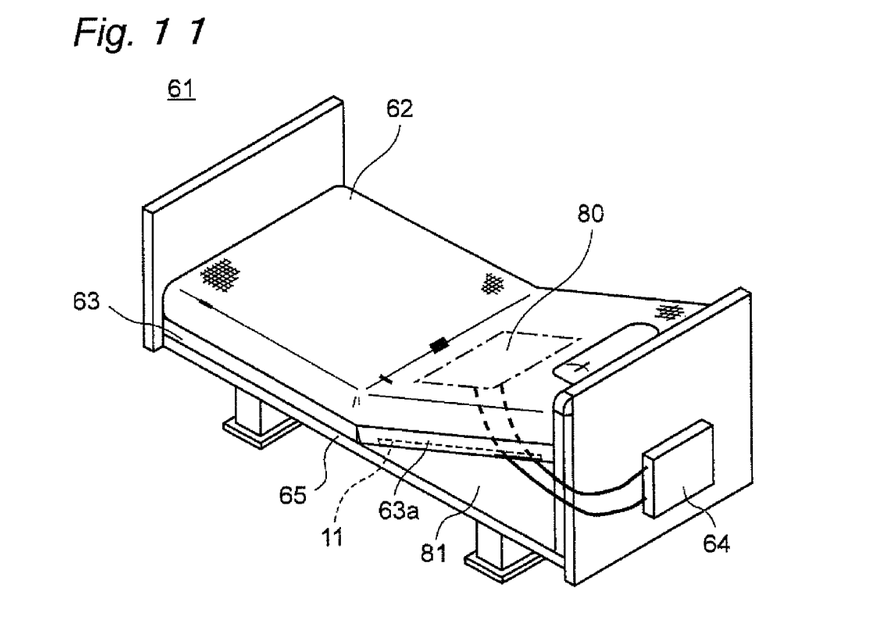
FIG. 11 is a perspective view of a care bed according to a fifth embodiment of the present invention.

FIG. 11 is a perspective view of a care bed 61 according to a fifth embodiment of the present invention.

Figure 12:
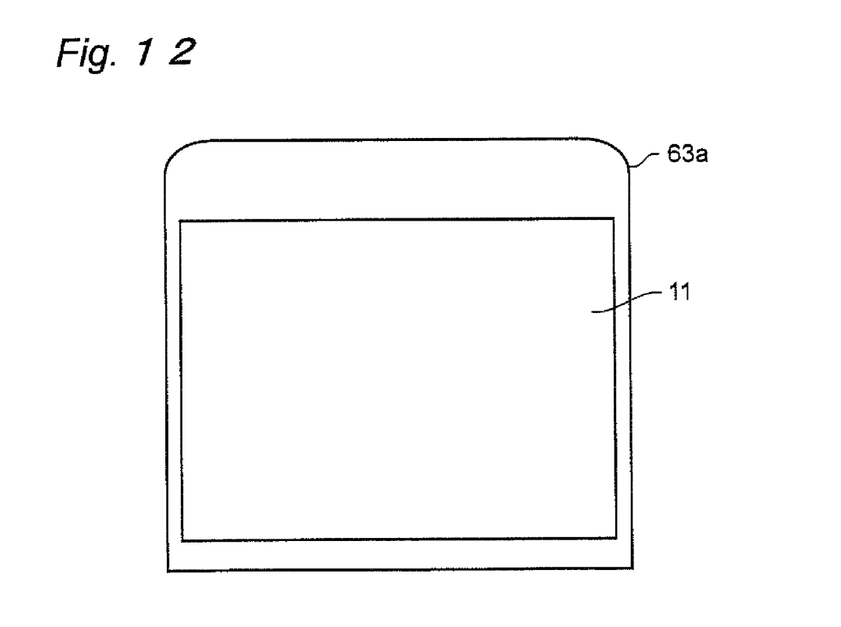
FIG. 12 is a back view of a backrest bottom of the care bed of the fifth embodiment.

FIG. 12 is a back view of a backrest bottom of the care bed 61 according to the fifth embodiment.

As shown in FIGS. 11 and 12, the care bed 61 of the fifth embodiment has such a structure that the contact sensor 11 is mounted on a surface of a bed casing (in this case, the backface of a backrest bottom 63*a*).

The care bed 61 includes a mattress 62 on which a cared person is to lie on, a bottom portion 63 for supporting the mattress 62, a driving unit 80 for changing the inclination of the backrest bottom 63*a* which constitutes a portion of the bottom portion 63, a controller 64 for performing control over the driving unit 80, and a bed frame 65 for supporting the bottom portion 63 at the lower side. The driving unit 80 includes a forward/reverse motor, a known backrest bottom inclining mechanism coupled to the rotor shaft of the motor, and other components.

The care bed 61 is capable of having the backrest of the mattress 62 raised and lowered by manipulation on a remote control (not shown) that is connected to the controller 64, so as to cause the backrest bottom 63*a* to move by means of the driving unit 80. For example, for taking a meal, a caretaker raises the backrest bottom 63*a* as shown in FIG. 11 so that the backrest of the care bed 61 can be raised. For laying the cared person down, the backrest bottom 63*a* is lowered, so that the mattress 62 can be brought into a horizontal, flat state without inclination.

However, when the backrest bottom 63*a* is lowered into a flatter condition from the backrest raised state, something may be nipped into space 81 between the backrest bottom 63*a* and the bed frame 65. For example, as the backrest bottom 63*a* is moved with the cared person or the caretaker being in the vicinity of the bed, a finger or a hand of the cared person or the caretaker may be inadvertently nipped into the space 81 between the backrest bottom 63*a* and the bed frame 65.

The care bed 61 of the fifth embodiment has the contact sensor 11 mounted on the surface of the backface (the lower surface in FIG. 11) of the backrest bottom 63*a*, thus enabling detection of contact of a portion of a human body on the backface of the backrest bottom 63*a* by the contact sensor 11. Upon detection of contact of the portion of the human body by the contact sensor 11, the controller 64 coupled to the contact sensor 11 is activated to stop the operation of the driving unit 80.

Accordingly, the contact sensor 11 is adapted to detect contact of a human body so as to stop the driving unit 80 even when the portion of the human body comes into the space 81 between the backrest bottom 63*a* and the bed frame 65, which imparts increased safety to the care bed.

It is be noted that the care bed 61 is described as an example of a driver device, but the driver device may be, for example, an industrial robot with a movable arm portion.

By properly combining the arbitrary embodiments of the aforementioned various embodiments, the effects possessed by the embodiments can be produced.

The contact sensors according to the embodiments of the present invention can detect contact of a soft object such as a portion of a human body and are thus usefully applied as contact sensors and for driving control of driver devices of, for example, care beds or industrial robots.

Although the present invention has been fully described in connection with the embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A contact sensor, comprising:
an insulative spacer having a plurality of openings;
a first conductive sheet touching a first surface of the insulative spacer and being deformable in such a manner as to get into any of the openings in the insulative spacer; and
a second conductive sheet touching a second surface of the insulative spacer and being deformable in such a manner as to get into any of the openings in the insulative spacer, wherein
electrical contact between the first conductive sheet and the second conductive sheet is to be established through the openings of the insulative spacer to provide contact detection,
the insulative spacer is configured of a plurality of insulative lines combined in a grid pattern,
the insulative lines have first end portions fixed to the first conductive sheet at one end side and second end portions fixed to the second conductive sheet at an other end side,
the second conductive sheet has first holding portions for slidably holding the insulative lines outside a grid-patterned area having the insulative lines combined in a grid pattern and at a side of the first end portions, and
the first conductive sheet has second holding portions for slidably holding the insulative lines outside the grid-patterned area and at a side of the second end portions.

2. A contact sensor, comprising:
a second conductive sheet applied with insulative pieces and being deformable to accept sinking of the insulative pieces therein; and
a first conductive sheet deformable to get into a gap between any of the insulative pieces, wherein
electrical contact between the first conductive sheet and the second conductive sheet is to be established through the gaps between the insulative pieces to provide contact detection, and
each of the insulative pieces has a cross-sectional shape with a tip thereof tapered toward the first conductive sheet.

3. The contact sensor according to claim 1, wherein the second conductive sheet is a sheet flexible in a thickness direction thereof.

4. The contact sensor according to claim 2, wherein the second conductive sheet is a sheet flexible in a thickness direction thereof.

5. The contact sensor according to claim 1, wherein the second conductive sheet is equal to or greater in thickness than the insulative spacer.

6. The contact sensor according to claim 1, wherein an area of a sensitive region defined by the openings and an area of an insensitive region defined by the insulative spacer are adapted to establish a relationship of $0.95 \geq$ the area of the sensitive region/(the area of the sensitive region+the area of the insensitive region)$\geq 0.6$.

7. The contact sensor according to claim 1, wherein the insulative lines each have a cross-sectional shape with a tip thereof tapered toward the first conductive sheet.

8. The contact sensor according to claim 7, wherein the insulative lines each have a cross-sectional shape having a circular arcuate tip at a side of the first conductive sheet.

9. The contact sensor according to claim 8, wherein the insulative lines each have a cross-sectional shape having a flat tip at a side of the second conductive sheet.

10. The contact sensor according to claim 2, wherein the second insulative sheet is greater in thickness than the insulative pieces.

11. The contact sensor according to claim 2, wherein an area of a sensitive region defined by the openings and an area of an insensitive region defined by the insulative pieces are adapted to establish a relationship of $0.95 \geq$ the area of the sensitive region/(the area of the sensitive region+the area of the insensitive region)$\geq 0.6$.

12. The contact sensor according to claim 2, wherein each of the insulative pieces has a cross sectional shape having a circular arcuate tip at a side of the first conductive sheet.

13. The contact sensor according to claim 12, wherein each of the insulative pieces has a cross-sectional shape having a flat tip at a side of the second conductive sheet.

14. The contact sensor according to claim 1, wherein the contact sensor is attached to a surface of a casing of a driver device that is configured to be drive-controlled based on contact detection by the contact sensor.

15. The contact sensor according to claim 2, wherein the contact sensor is attached to a surface of a casing of a driver device that is configured to be drive-controlled based on contact detection by the contact sensor.

16. The contact sensor according to claim 1, wherein the contact sensor is included in a care bed.

17. The contact sensor according to claim 2, wherein the contact sensor is included in a care bed.

* * * * *